(12) United States Patent
Lee et al.

(10) Patent No.: US 8,644,639 B2
(45) Date of Patent: Feb. 4, 2014

(54) SYSTEM AND METHOD FOR REDUCTION OF BLOCK NOISE

(75) Inventors: Seung Sin Lee, Yongin-si (KR); Young Ran Han, Suwon-si (KR); Du-Sik Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1247 days.

(21) Appl. No.: 12/453,346

(22) Filed: May 7, 2009

(65) Prior Publication Data

US 2010/0111422 A1  May 6, 2010

(30) Foreign Application Priority Data

Nov. 6, 2008  (KR) .................. 10-2008-0109648

(51) Int. Cl.
  *G06K 9/66*  (2006.01)
  *G06K 9/38*  (2006.01)
  *G06K 9/40*  (2006.01)

(52) U.S. Cl.
  USPC ........... 382/275; 382/195; 382/272; 382/274; 382/260; 382/268; 382/269

(58) Field of Classification Search
  CPC ............. G06K 9/66; G06K 9/38; G06K 9/40
  USPC .......... 382/195, 272, 274, 275, 260, 268, 269
  See application file for complete search history.

(56) References Cited

U.S. PATENT DOCUMENTS

| | | | | |
|---|---|---|---|---|
| 5,561,724 A | * | 10/1996 | Kido et al. | 382/264 |
| 6,724,943 B2 | * | 4/2004 | Tsuchiya et al. | 382/261 |
| 7,203,234 B1 | * | 4/2007 | Zeng | 375/240.03 |
| 7,590,300 B2 | * | 9/2009 | Tadas et al. | 382/260 |
| 8,031,967 B2 | * | 10/2011 | Zhang et al. | 382/275 |
| 8,131,105 B2 | * | 3/2012 | Chao et al. | 382/268 |
| 8,139,883 B2 | * | 3/2012 | Zhang et al. | 382/254 |
| 2005/0157796 A1 | | 7/2005 | Suzuki | |
| 2006/0171467 A1 | | 8/2006 | Schoner | |
| 2006/0221249 A1 | * | 10/2006 | Lin et al. | 348/607 |
| 2008/0231753 A1 | * | 9/2008 | Fujiwara et al. | 348/607 |
| 2009/0052798 A1 | * | 2/2009 | Kwon et al. | 382/264 |

FOREIGN PATENT DOCUMENTS

| | | |
|---|---|---|
| EP | 1 401 210 | 3/2004 |
| JP | 6-348842 | 12/1994 |
| JP | 9-149417 | 6/1997 |
| JP | 2003-274404 | 9/2003 |

(Continued)

OTHER PUBLICATIONS

PCT International Search Report, dated Apr. 20, 2011 in corresponding International Patent Application No. PCT/KR2009/002719.

(Continued)

*Primary Examiner* — Matthew Bella
*Assistant Examiner* — Jose M Torres
(74) *Attorney, Agent, or Firm* — Staas & Halsey LLP

(57) ABSTRACT

A block noise reduction system and method which may determine a feature value of a local texture at each location of input pixel, may selectively determine 1D filtering mode or 2D filtering mode as a filtering mode based on the determined feature value, and may perform filtering to preserve an edge according to the determined filtering mode.

20 Claims, 6 Drawing Sheets

(56) References Cited

FOREIGN PATENT DOCUMENTS

| | | |
|---|---|---|
| JP | 2008-47102 | 2/2008 |
| JP | 2008-182477 | 8/2008 |
| KR | 10-0683060 | 6/2006 |
| KR | 10-2007-0122407 | 12/2007 |

OTHER PUBLICATIONS

Japanese Office Action issued May 28, 2013 in corresponding Japanese Patent Application No. 2011-534367.

* cited by examiner

FIG. 2A

$$T = \frac{\Sigma \left[\begin{array}{c}\leftrightarrow\\\leftrightarrow\\\leftrightarrow\end{array}\right]^2 + \Sigma \left[\begin{array}{c}\updownarrow\updownarrow\updownarrow\end{array}\right]^2}{\Sigma \left[\begin{array}{c}\leftrightarrow\leftrightarrow\\\leftrightarrow\leftrightarrow\\\leftrightarrow\leftrightarrow\end{array}\right]^2 + \Sigma \left[\begin{array}{c}\updownarrow\updownarrow\updownarrow\end{array}\right]^2}$$

FIG. 2B

| 0 | 2 | 2 |
|---|---|---|
| 0 | 2 | 2 |
| 0 | 2 | 2 |

$$T = \frac{(2^2+2^2+2^2)+0}{(2^2+2^2+2^2)+0} = 1$$

SYSTEM AND METHOD FOR REDUCTION OF BLOCK NOISE

CROSS-REFERENCE TO RELATED APPLICATIONS

This application claims the priority benefit of Korean Patent Application No. 10-2008-0109648, filed on Nov. 6, 2008, in the Korean Intellectual Property Office, the disclosure of which is incorporated herein by reference.

BACKGROUND

1. Field

Exemplary embodiments relate to a block noise elimination in a block-based image compression method, and more particularly, to block noise reduction by performing a selective filtering using a block noise detection by a local texture in a location of each pixel of an input image.

2. Description of the Related Art

An image compression method which is based on a block-based discrete cosine transform (DCT), such as MPEG, JPEG, and H.264, divides an image into blocks, each block including N*N pixels, and individually applies DCT to each of the blocks. In this instance, a discontinuous block noise may occur due to breaking off with an adjacent block. Also, a problem that an image quality is deteriorated may occur due to the block noise.

Accordingly, the noise elimination is needed in the block-based image compression method. In addition, when the block noise is eliminated, effectively eliminating the block noise is important while high frequency components, such as an edge of an image, a detail, and the like, are minimized.

SUMMARY

According to exemplary embodiments, there may be provided a system for reducing a block noise, the system including a feature value calculating unit to calculate a feature value of a local texture with respect to the input pixel using pixel values of an input pixel and adjacent pixels, wherein the feature value calculating unit includes at least one processor to calculate the feature value; a filtering mode determining unit to determine a filtering mode as either a 1D (one dimensional) filtering mode or a 2D (two dimensional) filtering mode based on whether the calculated feature value falls in a range of feature values where a 2D filtering is applied; and a filtering performing unit to perform filtering with respect to the input pixel based on the determined filtering mode.

The filtering performing unit may include a 2D filtering performing unit to perform edge component detection with respect to pixels included in a 2D filter mask and to perform 2D filtering using pixel values of the pixels that are readjusted according to a result of the edge component detection, when the determined filtering mode is the 2D filtering mode, and a 1D filtering performing unit to perform 1D filtering based on a direction of the input pixel, when the determined filtering mode is the 1D filtering mode.

Also, the filtering performing unit may further include a direction determining unit to determine a direction of the central pixel based on a pixel value difference between a central pixel and each of the adjacent pixels around the central pixel included in the 1D filter mask, when the determined filtering mode is the 1D filtering mode.

According to exemplary embodiments, there may be provided a method for reducing a block noise, the method including calculating a feature value of a local texture with respect to an input pixel using pixel values of the input pixel and adjacent pixels around the input pixel, determining a filtering mode as either a 1D (one dimensional) filtering mode or a 2D (two dimensional) filtering mode based on whether the calculated feature value falls in a range of feature values where a 2D filtering is applied, and performing filtering with respect to the input pixel based on the determined filtering mode, wherein the method is performed using at least one processor.

Also, the performing of the filtering may include performing edge component detection with respect to pixels included in a 2D filter mask, and performing 2D filtering using pixel values of the pixels that are readjusted according to a result of the edge component detection, when the determined filtering mode is the 2D filtering mode, and performing 1D filtering based on a direction of the input pixel, when the determined filtering mode is the 1D filtering mode.

The performing of the filtering may determine a direction of the central pixel based on a pixel value difference between a central pixel and each of the adjacent pixels around the central pixel included in the 1D filter mask, when the determined filtering mode is 1D filtering mode.

Additional aspects of exemplary embodiments will be set forth in part in the description which follows and, in part, will be apparent from the description, or may be learned by practice of the disclosure.

BRIEF DESCRIPTION OF THE DRAWINGS

These and/or other aspects of exemplary embodiments will become apparent and more readily appreciated from the following description, taken in conjunction with the accompanying drawings of which:

FIGS. 2A and 2B illustrate a process of calculating a feature value of a local texture of an input pixel according to exemplary embodiments;

DETAILED DESCRIPTION

Figure 1:
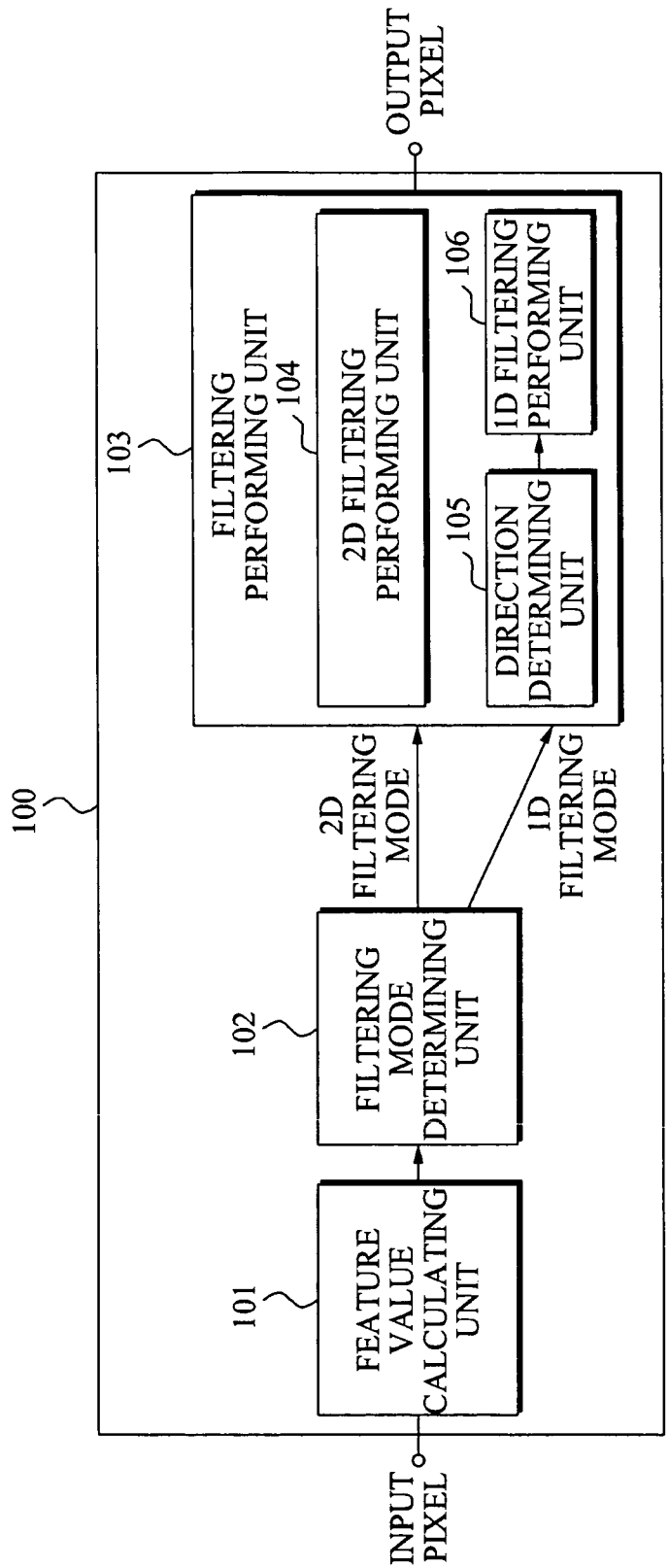
FIG. 1 is a block diagram illustrating an entire configuration of a block noise reduction system according to exemplary embodiments.

Reference will now be made in detail to exemplary embodiments, examples of which are illustrated in the accompanying drawings, wherein like reference numerals refer to the like elements throughout. Exemplary embodiments are described below to explain the disclosure by referring to the figures.

According to exemplary embodiments, existence of a block noise of an input image is determined by calculating a feature value of a local texture with respect to the input pixel.

According to exemplary embodiments, either a 1D filtering mode or a 2D filtering mode is selectively determined as a filtering mode based on whether the feature value of the local texture is in a range where a 2D filtering is applied, and thus, a filtering with respect to the block noise is adaptively performed.

According to exemplary embodiments, an adjacent pixel having a great difference in a pixel value with a central pixel included in a filter mask is determined to be an edge, and thus, the pixel value of the central pixel is substituted and a filtering is performed, thereby reducing the block noise and preserving the edge of the input image at the same time.

Reference will now be made in detail to exemplary embodiments, examples of which are illustrated in the accompanying drawings, wherein like reference numerals refer to the like elements throughout. Exemplary embodiments are described below to explain the present disclosure by referring to the figures. A block noise reduction method according to exemplary embodiments may be performed by a block noise reduction system.

FIG. 1 is a block diagram illustrating an entire configuration of the block noise reduction system according to exemplary embodiments.

Referring to FIG. 1, the block noise reduction system 100 may include a feature value calculating unit 101, filtering mode determining unit 102, and a filtering performing unit 103. In this instance, the filtering performing unit 103 may include a 2D (two dimensional) filtering performing unit 104, a direction determining unit 105, and a 1D (one dimensional) filtering performing unit 106.

The feature value calculating unit 101 may calculate a feature value of a local texture with respect to an input pixel using pixel values of the input pixel and adjacent pixels. Here, the local texture is a texture component that is constituted by pixels adjacent to the input pixel within a limited-size area. As an example, the feature calculating unit 101 may calculate the feature value of the local texture with respect to the input pixel using a pixel value difference in horizontal direction and a pixel value difference in a vertical direction based on the pixel values of the input pixel and adjacent pixels.

Whether a block noise exists is determined by calculating a feature value of a local texture component with respect to each input pixel included in an input image. As an example, the feature value of the local texture is a ratio of deviation between pixels of a local area according to a distance between the pixels. The local texture feature value may be 0 (zero) in a uniform area having no difference between the pixels of the local area, regardless of a distance between adjacent pixels. Also, as an adjacent pixel difference, the deviation between pixels, or a difference between pixels increases, the pixels being a certain distance or more apart compared with the deviation between pixels, the local texture component is determined to be high. Particularly, when a texture has an given pattern in the smooth area, the local texture feature value according to exemplary embodiments may be concentrated around a certain value such as 1 (one).

Accordingly, a visually well-sensed area, such as a block noise in the smooth area, may be effectively detected. Therefore, in the smooth area of an input image having the block noise, the local texture feature value may be a value close to 0. Also, when the block noise is visually and easily sensed, the local texture feature value has a value in a predetermined range, such as 1, and the local texture feature value increases as a detail of an image increases. A detailed process of calculating the feature value will be described with reference to FIGS. 2A and 2B.

A filtering mode determining unit 102 may determine a filtering mode as either the 1D filtering mode or the 2D filtering mode based on whether the calculated feature value is in a range of feature values where a 2D filtering is applied.

In this instance, the range of the feature values may be changed by adjusting a predetermined threshold. As an example, in the input image, an area where the 2D filtering is applied is a distinguished area a feature value (T) of which is "1", and the area may indicate an area in which a relatively strong filtering is needed to be applied with respect to a block noise occurring in a relatively smooth area.

Also, when a strong texture component exists around an object included in the input image, a result of the 2D filtering may be degradation of image quality, such as blurring and the like. Accordingly, to increase efficiency of reducing of the block, a 1D filtering may be applied to an area where the degradation of the image quality may occur as the result of the 2D filtering.

As an example, when the feature value is in the range of feature values where the predetermined 2D filtering is applied, the filtering mode determining unit 102 may determine the filtering mode with respect to the input image as the 2D filtering mode. Also, when the feature value is outside the range of feature values where the predetermined 2D filtering is applied, the filtering mode determining unit 102 may determine the filtering mode with respect to the input image as the 1D filtering mode.

The filtering performing unit 103 may perform filtering with respect to the input pixel based on the determined filtering mode. As an example, the filtering performing unit 103 may include the 2D filtering performing unit 104, the direction determining unit 105, and the 1D filtering performing unit 106.

The 2D filtering performing unit 104 may perform edge component detection with respect to pixels included in a 2D filter mask. In general, a low-pass filter may be used when the filtering is performed. In this instance, when the filtering is applied to an edge included in a filtering area, degradation of the image may occur due to blurring of the edge. Accordingly, a method that may preserve the edge by preventing the image from degradation and that may reduce the block noise may be applied to the block noise reduction system according to exemplary embodiments.

As an example, to determine whether an edge component exists in the filtering area, the 2D filtering performing unit 104 may compare a pixel value difference between a central pixel and each pixel adjacent to the central pixel included in a 2D filter mask with a threshold with respect to the predetermined 2D filtering, and may perform edge component detection with respect to each of the adjacent pixels. In this instance, the 2D filtering performing unit 104 performs edge component detection that determines an adjacent pixel having a pixel value difference greater than the threshold with respect to the predetermined 2D filtering from among adjacent pixels included in the 2D filter mask as the edge component.

Also, the 2D filtering performing unit 104 may perform the 2D filtering using pixel values of the pixels readjusted according to a result of the edge component detection. As an example, the 2D filtering performing unit 104 may replace a pixel value of an adjacent pixel determined to be an edge component through the edge component detection with a pixel value of the central pixel, and may perform the 2D filtering using the readjusted pixel value. Accordingly, the adjacent pixel determined to be the edge component is replaced with the pixel value of the central pixel, and thus, a result of the 2D filtering is turned out to be relatively small, thereby preserving the edge of the input image.

The 2D filtering performing unit 104 will be described in detail with reference to FIG. 3.

As described above, an area where the result of the 2D filtering is not shown may mostly indicate an area having a lot of details in an image. When the 2D filtering is applied to the area having much detail, excessive blurring may occur and image quality of the input image may be degraded. Therefore, degrading of the image quality is minimized and the block noise reduction is improved by applying the 1D filtering to the area where the 2D filtering is not applied.

Unlike a general noise, the block noise may have a given pattern in a vertical direction and in a horizontal direction. Accordingly, to detect the pattern, the block noise reduction system 100 may determine a direction of a central pixel within a predetermined area centered on the central pixel included in a filter mask used for the 1D filtering, and may determine a direction of the 1D filtering according to a result of the check.

When the determined filtering mode is the 1D filtering mode, the direction determining unit 105 may determine the direction of the central pixel based on a pixel value difference between the central pixel and each of adjacent pixels around the central pixel included in the 1D filter mask. For example, the direction determining unit 105 may determine a direction having a least pixel value difference between the central pixel and each of the adjacent pixels from among a horizontal direction (0 degrees), a vertical direction (90 degrees), and a diagonal direction (45 degrees and 135 degrees) as the direction of the central pixel.

A detailed process of determining the direction of the central pixel will be described with reference FIG. 4.

The 1D filtering performing unit 106 may perform the 1D filtering based on a direction of the input pixel. As an example, the 1D filtering performing unit 106 may replace a pixel value of an adjacent pixel having a pixel value difference greater than a predetermined threshold with respect to the 1D filtering with a pixel value of the central pixel, the pixel value difference being a difference between the central pixel and each of the adjacent pixels included in the 1D filter mask.

A detailed process of performing the 1D filtering will be described with reference to FIG. 5.

FIGS. 2A and 2B illustrate a process of calculating a feature value of a local texture of an input pixel according to exemplary embodiments.

As an example, a feature value calculating unit 101 may calculate a feature value of a local texture with respect to an input pixel using a pixel value of the input value and adjacent pixels around the input pixel. As an example, the feature value calculating unit 101 may calculate the feature value of the local texture with respect to the input pixel using a pixel value in a horizontal direction and a pixel value in a vertical direction based on the pixel values of the input pixel and the adjacent pixels.

Referring to FIGS. 2A and 2B, T is the feature value of the local texture. Also, a 3*3 area is determined with respect to the input pixel to calculate the feature value of the local texture.

As an example, the feature value calculating unit 101 may calculate the feature value of the local texture with respect to the input pixel using Equation 1 as given below.

$$T = \frac{\left( \sum_{k=0,1,2} [f(x+2, y+k) - f(x, y+k)]^2 + \sum_{k=0,1,2} [f(x+k, y+2) - f(x+k, y)]^2 \right)}{\left( \sum_{l=0,1} \sum_{k=0,1,2} [f(x+l+1, y+k) - f(x+l, y+k)]^2 + \sum_{l=0,1} \sum_{k=0,1,2} [f(x+k, y+l+1) - f(x+k, y+l)]^2 \right)}$$

[Equation 1]

-continued when $$\sum_{l=0,1} \sum_{k=0,1,2} [f(x+l+1, y+k) - f(x+l, y+k)]^2 + \sum_{l=0,1} \sum_{k=0,1,2} [f(x+k, y+l+1) - f(x+k, y+l)]^2 = 0,$$

then $T = 0$

Here, f(x,y) indicates a pixel value at (x,y) of an input image. The Equation 1 may be schematized as illustrated in FIG. 2A. The set area is determined by k and l, and may be changed depending on a condition of a system.

FIG. 2B illustrates an example of calculating the feature value of the input pixel using a distribution of pixel values and the pixel values in the 3*3 area. Here, a pixel located in a center of the 3*3 area in FIG. 2B is the input pixel. In this instance, when a block noise occurs in an smooth area, a feature value T may have a value adjacent to 1. The feature value of the local texture with respect to the input pixel may be determined to be high as a detail in an image increases. When feature values with respect to all pixels included in the input image are determined, a filtering mode determining unit 102 may determine a filtering mode as either a 1D filtering mode or a 2D filtering mode based on whether the calculated feature value is in a range of feature values where a 2D filtering is applied.

As an example, the filtering mode determining unit 102 may determine the filtering mode using the range of feature values where the 2D filtering is applied, based on Equation 2.

$$1-TH_H \le T \le 1+TH_H \qquad \text{[Equation 2]}$$

Here, $TH_H$ is a predetermined threshold. As $TH_H$ increases, the area where the 2D filtering is applied increases. Accordingly, the feature value T of the input pixel is in the range of Equation 2, the filtering mode determining unit 102 determines the 2D filtering mode as the filtering mode, and when the feature value T of the input pixel is outside the range of Equation 2, the filtering mode determining unit 102 determines the 1D filtering mode as the filtering mode.

Figure 3:
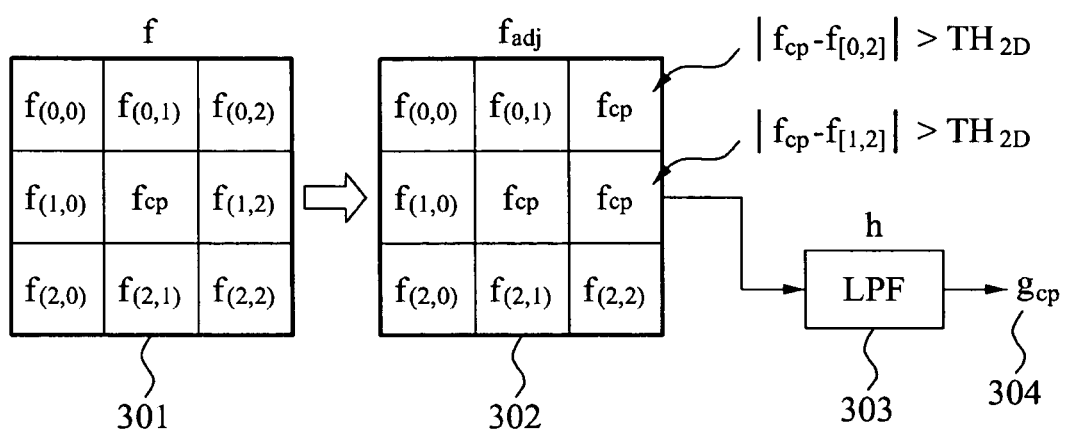
FIG. 3 illustrates a process of performing 2D filtering according to exemplary embodiments.

FIG. 3 illustrates a process of performing 2D filtering according to exemplary embodiments.

A 2D filtering performing unit 104 may perform edge component detection with respect to pixels included in a 2D filter mask. Also, the 2D filtering performing unit 104 may replace a pixel value of adjacent pixels with a pixel value of a central pixel based on a result of the edge component detection. Subsequently, the 2D filtering performing unit 104 may perform 2D filtering using pixel values of the central pixel and adjacent pixels included in the 2D filter mask.

A filter mask 301 is a 3*3 filter mask including the central pixel and adjacent pixels around the central pixel. Also, a filter mask 302 is the filter mask in which pixel values of adjacent pixels determined to be edge components through the edge component detection are replaced with the pixel value of the central pixel.

As an example, the 2D filtering performing unit 104 may perform 2D filtering according to Equation 3 as given below.

$$g(i, j) = \sum_k \sum_l h(i-k, j-l) f_{adj}(k, l) \qquad \text{[Equation 3]}$$

-continued $$f_{adj}(i, j) = \begin{cases} f(i, j) & \text{if } |f(i, j) - f_{cp}| < TH_{2D} \\ f_{cp} & \text{otherwise} \end{cases}$$

Here, $f_{cp}$ is a pixel value of a central pixel included in a filter mask, $f_{adj}$ is a pixel value of an adjacent pixel readjusted by edge component detection, and h(i, j) is a 2D filter, which is a low-pass filter. Also, $|f(i,j)-f_{cp}|<TH_{2D}$ is the edge component detection.

Referring to FIG. 3, adjacent pixels respectively at (0, 2) and (1, 2) centered on the central pixel from among adjacent pixels included in the 3*3 filter mask 302 are determined to be edge component through the edge component detection. Subsequently, to preserve the edge compounded from the 2D filtering, the 2D filtering performing unit 104 may replace the pixel values of the adjacent pixels corresponding to the edge component with the pixel value of the central pixel.

Referring to FIG. 3, the 2D filtering performing unit 104 may replace pixel values $f_{(0, 2)}$ and $f_{(1, 2)}$ respectively located at (0, 2) and (1, 2) centered on the central pixel with the pixel value of the central pixel, $f_{cp}$. Subsequently, the 2D filtering unit 104 may apply a 2D filter 303 (low pass filter) to the replaced pixel values to perform 2D filtering. A result of the 2D filtering is $g_{cp}$ (304).

Figure 4:
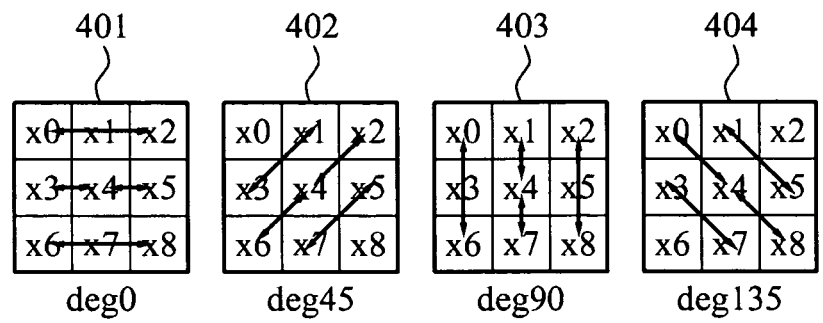
FIG. 4 illustrates a process of determining a direction of a central pixel to perform a 1D filtering according to exemplary embodiments.

FIG. 4 illustrates a process of determining a direction of a central pixel to perform a 1D filtering according to exemplary embodiments.

A direction determining unit 105 may determine the direction of the central pixel based on pixel value differences between the central pixel and each of adjacent pixels around the central pixel included in 1D filter masks 401, 402, 403, and 404. As an example, the direction determining unit 105 may determine the direction of the central pixel based on Equation 4 as given below.

$$deg0=|x0-x2|+|x3-x4|+|x4-x5|+|x6-x8|$$

$$deg45=|x1-x3|+|x2-x4|+|x4-x6|+|x5-x7|$$

$$deg90=|x0-x6|+|x1-x4|+|x4-x7|+|x2-x8|$$

$$deg135=|x1-x5|+|x0-x4|+|x4-x8|+|x3-x7|$$

$$\text{degree}=\min(deg0, deg45, deg90, deg135) \qquad \text{[Equation 4]}$$

The central pixel is x4 in the 1D filter masks 401, 402, 403, and 404 which are in a 3*3 area. That is, according to Equation 4, the direction determining unit 105 may calculate a pixel value difference between adjacent pixels in a horizontal direction (deg0), in a vertical direction (deg90), and in a diagonal direction (deg45, deg135) centered on the center pixel, x4. Also, the direction determining unit 105 may determine a direction having a least value obtained by summing the calculated pixel value differences, as the direction of the central pixel.

Figure 5:
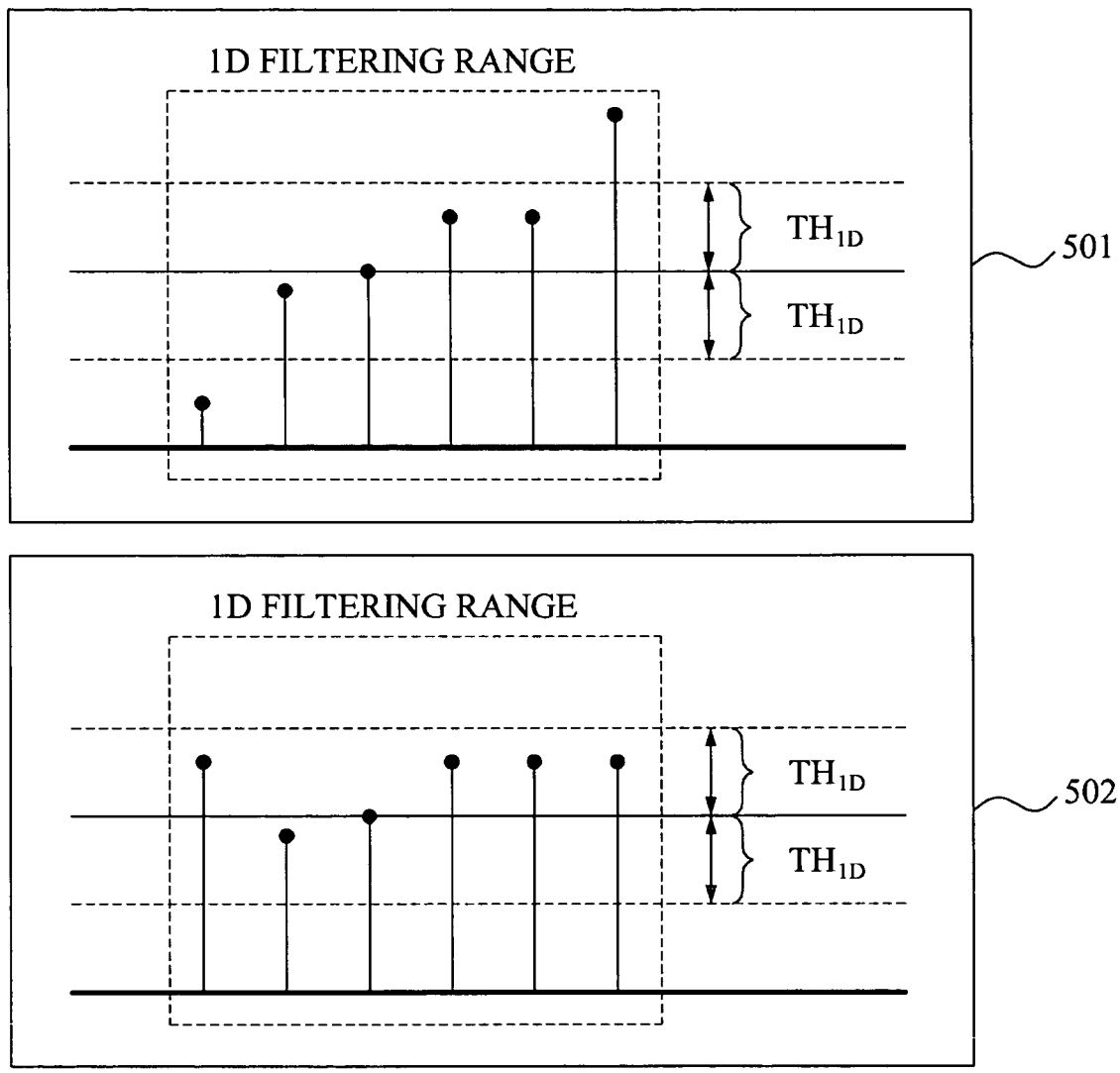
FIG. 5 illustrates a process of performing a 1D filtering according to exemplary embodiments.

FIG. 5 illustrates a process of performing a 1D filtering according to exemplary embodiments.

A 1D filtering unit 106 may perform 1D filtering according to a direction of a central pixel, the direction being determined by a direction determining unit 105. As an example, with respect to remaining(*other) directions, for example, directions of 45 degrees and 135 degrees of FIG. 4, besides directions of 0 degrees and 90 degrees where a block noise may exist, the 1D filtering performing unit 106 may either bypass a filtering or perform a 1D filtering according to the determined direction of the central pixel, depending on a case.

Also, the 1D filtering performing unit 106 may perform 1D filtering with respect to the directions of 0 degrees and 90 degrees where the block noise may exist. As an example, the 1D filtering performing unit 106 may replace a pixel value of an adjacent pixel having a pixel value difference greater than a predetermined threshold with respect to the 1D filtering with a pixel value of the central pixel, the pixel value difference being a difference between the central pixel and each of adjacent pixels included in the 1D filter mask.

Referring to FIG. 5, a vertical axis in a graph 501 is a pixel value of each of pixels included in the 1D filter mask. Also, the pixel value of the central pixel in the graph 501 is a $4^{th}$ pixel from a left. The 1D filtering performing unit 106 may calculate the pixel value difference between the central pixel and each of the adjacent pixels. In this instance, a pixel value difference between the central pixel and a $1^{st}$ adjacent pixel from the left and a pixel value difference between the central pixel and a $6^{th}$ adjacent pixel from the left are greater than a $TH_{1D}$ with respect to a predetermined 1D filtering.

When the pixel difference is greater than the predetermined $TH_{1D}$ with respect to the 1D filtering, a corresponding adjacent pixel may be determined to be an edge or a detail. Accordingly, the 1D filtering performing unit 106 may replace a pixel value of the adjacent pixel that is determined as the edge or detail with the pixel value of the central pixel and may perform the 1D filtering, thereby minimizing degradation of the edge or the detail.

Accordingly, the 1D filtering performing unit 106 may replace a pixel value of the $1^{st}$ adjacent pixel and a pixel value of the $6^{th}$ adjacent pixel with the pixel value of the central pixel. A result of replacement of the pixel values is illustrated in a graph 502.

Figure 6:
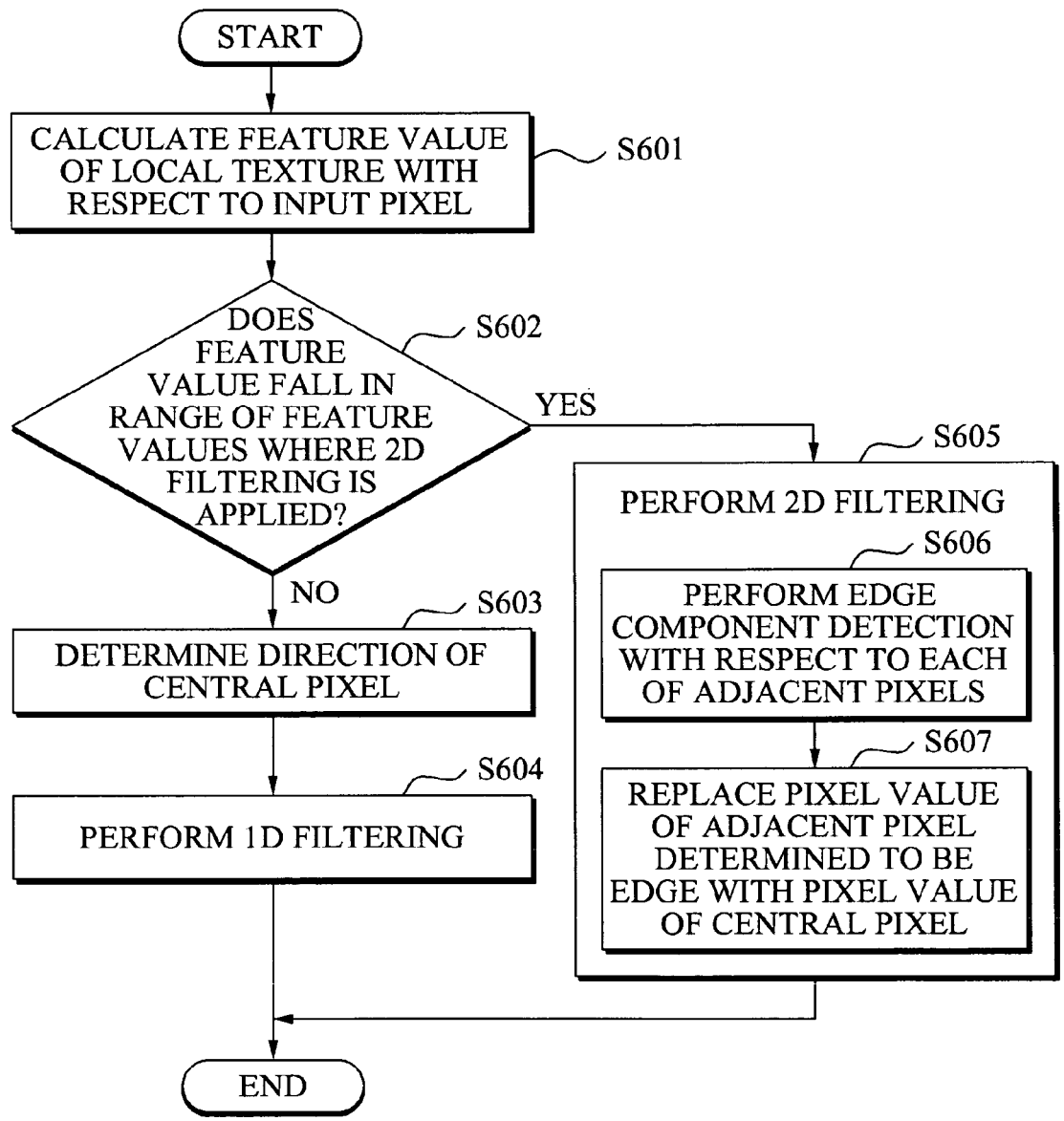
FIG. 6 is a flowchart illustrating a block noise reduction method according to exemplary embodiments.

FIG. 6 is a flowchart illustrating a block noise reduction method according to exemplary embodiments.

In operation S601, a block noise reduction system may calculate a feature value of a local texture with respect to an input pixel using pixel values of the input pixel and adjacent pixels around the input pixel. In this instance, the block noise reduction system may calculate the feature value of the local texture with respect to the input pixel using a pixel value difference in a horizontal direction and a pixel value difference in a vertical direction based on the pixel values of the input pixel and the adjacent pixels.

In operation S602, the block noise reduction system may determine a filtering mode as either a 1D filtering mode or a 2D filtering mode based on whether the calculated feature value is in a range of feature values where a 2D filtering is applied. In this instance, when the feature value is in the range of the feature value where a predetermined 2D filtering is applied, the block noise reduction system may determine the 2D filtering mode as the filtering mode and proceed with operation S605.

Subsequently, in operation S605, the block noise reduction system may perform the 2D filtering. Particularly, in operation S606, the block noise reduction system may compare a pixel value difference between a central pixel and each of adjacent pixels around the central pixel included in a 2D filter mask with a threshold with respect to the predetermined 2D filtering, and may perform edge component detection with respect to each of the adjacent pixels.

In operation S607, the block noise reduction system may replace the value of an adjacent pixel that is determined to be an edge component through the edge component detection with the pixel value of the central pixel, thereby readjusting the pixel value. Therefore, the block noise reduction system may perform the 2D filtering using the replaced pixel value.

Also, when the feature value is outside the range of the feature values where the predetermined 2D filtering is applied, the block noise reduction system may determine the filtering mode as a 1D filtering mode and proceed with operation S603. In operation S603, the block noise reduction system may determine a direction of a central pixel based on a pixel value difference between the central pixel and each of adjacent pixels around the central pixel included in the 1D filter mask. In this instance, the block noise reduction system may determine an angle with respect to an adjacent pixel having a least pixel value difference as the direction of the central pixel.

Subsequently, in operation S604, the block noise reduction system may perform a 1D filtering according to the direction of the central pixel determined in operation S603. In this instance, with respect to other directions, for example, directions of 45 degrees and 135 degrees of FIG. 4, besides directions of 0 degrees and 90 degrees where a block noise may exist, the 1D filtering performing unit 106 may either bypass a filtering or perform the 1D filtering according to the determined direction of the central pixel, depending on a case.

Also, the block noise reduction system may perform the 1D filtering with respect to the directions of 0 degrees and 90 degrees where a block noise exists. As an example, the block noise reduction system may replace a pixel value of an adjacent pixel having pixel value difference greater than a threshold with respect to the predetermined 1D filtering, the pixel value difference being a difference between a central pixel and each of adjacent pixels around the central pixel included in the 1D filter mask.

An omitted portion in the description with reference to FIG. 6 may be understood with reference to the descriptions of FIG. 1 through FIG. 5.

Also, after the bock noise reduction method for block based image compression of an image according to the above-described exemplary embodiments is completed, the compressed image may be decompressed and displayed on a display unit.

Also, the block noise reduction method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, the present disclosure is not limited to the described exemplary embodiments. Instead, it would be appreciated by those skilled in the art that changes may be made to these exemplary embodiments without departing from the principles and spirit of the disclosure, the scope of which is defined by the claims and their equivalents.

According to exemplary embodiments, existence of a block noise of an input image is determined by calculating a feature value of a local texture with respect to the input pixel.

According to exemplary embodiments, either a 1D filtering mode or a 2D filtering mode is selectively determined as a filtering mode based on whether the feature value of the local texture is in a range where a 2D filtering is applied, and thus, a filtering with respect to the block noise is adaptively performed.

According to exemplary embodiments, an adjacent pixel having a great difference in a pixel value with a central pixel included in a filter mask is determined to be an edge, and thus, the pixel value of the central pixel is substituted and a filtering is performed, thereby reducing the block noise and preserving the edge of the input image at the same time.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A system for reducing a block noise, the system comprising:
   a feature value calculating unit to calculate a feature value of a local texture with respect to an input pixel using pixel values of the input pixel and adjacent pixels, wherein the feature value calculating unit includes at least one processor to calculate the feature value;
   a filtering mode determining unit to determine a filtering mode as either a 1D (one dimensional) filtering mode or a 2D (two dimensional) filtering mode based on whether the calculated feature value falls in a range of feature values where a 2D filtering is applied; and
   a filtering performing unit to perform filtering with respect to the input pixel based on the determined filtering mode.

2. The system of claim 1, wherein the feature value calculating unit calculates the feature value of the local texture with respect to the input pixel using a pixel value difference in a horizontal direction and a pixel value difference in a vertical direction based on the pixel values of the input pixel and each of the adjacent pixels.

3. The system of claim 2, wherein the feature value of the local texture increases as a detail of an image increases in an input image having a block noise.

4. The system of claim 1, wherein, when the feature value is in the range of the feature values where a predetermined 2D filtering is applied, the filtering mode determining unit determines the 2D filtering mode as the filtering mode, and when the feature value is outside the range of the feature values where a predetermined 2D filtering is applied, the filtering mode determining unit determines the 1D filtering mode as the filtering mode.

5. The system of claim 1, wherein the filtering performing unit comprises:
   a 2D filtering performing unit to perform edge component detection with respect to pixels included in a 2D filter mask and to perform 2D filtering using pixel values of the pixels that are readjusted according to a result of the edge component detection, when the determined filtering mode is the 2D filtering mode; and a 1D filtering performing unit to perform 1D filtering based on a direction of the input pixel, when the determined filtering mode is the 1D filtering mode.

6. The system of claim 5, wherein the 2D filtering performing unit performs edge component detection with respect to each of the adjacent pixels by comparing a pixel value difference between a central pixel and each of the adjacent pixels around the central pixel included in the 2D filter mask with a threshold with respect to the predetermined 2D filtering, and readjusts the pixel value by replacing a pixel value of an adjacent pixel determined to be an edge component through the edge component detection with a pixel value of the central pixel.

7. The system of claim 6, wherein the 2D filtering performing unit performs edge component detection that determines an adjacent pixel having a pixel value difference greater than the threshold with respect to the predetermine 2D filtering from among adjacent pixels included in the 2D filter mask as the edge component.

8. The system of claim 5, wherein the filtering performing unit further comprises:
a direction determining unit to determine a direction of the central pixel based on a pixel value difference between a central pixel and each of the adjacent pixels around the central pixel included in a 1D filter mask, when the determined filtering mode is the 1D filtering mode.

9. The system of claim 8, wherein the direction determining unit determines an angle with respect to an adjacent pixel having a least pixel value difference as the direction of the central pixel.

10. The system of claim 5, wherein the 1D filtering performing unit performs 1D filtering by replacing a pixel value of an adjacent pixel having a pixel value difference greater than a predetermined threshold with respect to the 1D filtering with a pixel value of the central pixel, the pixel value difference being a difference between a central pixel and each of adjacent pixels included in the 1D filter mask.

11. A method for reducing a block noise, the method comprising:
calculating a feature value of a local texture with respect to an input pixel using pixel values of the input pixel and adjacent pixels around the input pixel;
determining a filtering mode as either a 1D (one dimensional) filtering mode or a 2D (two dimensional) filtering mode based on whether the calculated feature value falls in a range of feature values where a 2D filtering is applied; and
performing filtering with respect to the input pixel based on the determined filtering mode,
wherein the method is performed using at least one processor.

12. The method of claim 11, wherein the calculating calculates the feature value of the local texture with respect to the input pixel using a pixel value difference in a horizontal direction and a pixel value difference in a vertical direction based on the pixel values of the input pixel and each of the adjacent pixels.

13. The method of claim 11, wherein the determining comprises:
determining the filtering mode as the 2D filtering mode when the feature value is in the range of feature values where a predetermined 2D filtering is applied; and
determining the filtering mode as the 1D filtering mode when the feature value is outside the range of feature values where the predetermined 2D filtering is applied.

14. The method of claim 11, wherein the performing of the filtering comprises:
performing edge component detection with respect to pixels included in a 2D filter mask, and performing 2D filtering using pixel values of the pixels that are readjusted according to a result of the edge component detection, when the determined filtering mode is the 2D filtering mode; and
performing 1D filtering based on a direction of the input pixel, when the determined filtering mode is the 1D filtering mode.

15. The method of claim 14, wherein the performing of the 2D filtering comprises:
performing edge component detection with respect to each of the adjacent pixels by comparing a pixel value difference between a central pixel and each of the adjacent pixels around the central pixel included in the 2D filter mask with a threshold with respect to the predetermined 2D filtering; and
readjusting the pixel value by replacing a pixel value of an adjacent pixel determined to be an edge component through the edge component detection with a pixel value of the central pixel.

16. The method of claim 15, wherein the performing of the edge component detection performs the edge component detection that determines an adjacent pixel having a pixel value difference greater than the threshold with respect to the predetermine 2D filtering from among adjacent pixels included in the 2D filter mask as the edge component.

17. The method of claim 14, wherein the performing of the filtering determines a direction of the central pixel based on a pixel value difference between a central pixel and each of the adjacent pixels around the central pixel included in a 1D filter mask, when the determined filtering mode is 1D filtering mode.

18. The method of claim 17, wherein the determining of the direction determines an angle with respect to an adjacent pixel having a least pixel value difference as the direction of the central pixel.

19. The method of claim 14, wherein the determining of the 1D filtering performs 1D filtering by replacing a pixel value of an adjacent pixel having a pixel value difference greater than a predetermined threshold with respect to the 1D filtering with a pixel value of the central pixel, the pixel value difference being a difference between a central pixel and each of adjacent pixels included in the 1D filter mask.

20. A non-transitory computer readable recording media storing program instructions to control at least one processor to implement the method of claim 11.

* * * * *

UNITED STATES PATENT AND TRADEMARK OFFICE
CERTIFICATE OF CORRECTION

PATENT NO.         : 8,644,639 B2
APPLICATION NO.    : 12/453346
DATED              : February 4, 2014
INVENTOR(S)        : Lee et al.

Page 1 of 1

It is certified that error appears in the above-identified patent and that said Letters Patent is hereby corrected as shown below:

In the Claims

Column 11, Line 17, in Claim 7, delete "predetermine" and insert -- predetermined --, therefor.
Column 12, Line 36, in Claim 16, delete "predetermine" and insert -- predetermined --, therefor.

Signed and Sealed this
Twenty-ninth Day of July, 2014

Michelle K. Lee
*Deputy Director of the United States Patent and Trademark Office*